United States Patent
Klein et al.

(10) Patent No.: US 7,111,183 B1
(45) Date of Patent: Sep. 19, 2006

(54) EXPANSION METHOD FOR COMPLEX POWER-SEQUENCING APPLICATIONS

(75) Inventors: Hans W. Klein, Danville, CA (US); Frederic N. F. Deboes, Austin, TX (US); Douglas C. Morse, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 652 days.

(21) Appl. No.: 10/269,804

(22) Filed: Oct. 10, 2002

(51) Int. Cl.
G06F 1/24 (2006.01)
G06F 1/26 (2006.01)

(52) U.S. Cl. .......................... 713/330; 713/1; 713/100

(58) Field of Classification Search .............. 713/1, 713/2, 100, 300–340, 400–401, 500–503, 713/600–601
See application file for complete search history.

(56) References Cited

U.S. PATENT DOCUMENTS

| 4,739,344 | A * | 4/1988 | Sullivan et al. | 346/76.1 |
| 5,809,312 | A * | 9/1998 | Ansel et al. | 713/300 |
| 5,936,443 | A * | 8/1999 | Yasuda et al. | 327/143 |
| 6,650,089 | B1 * | 11/2003 | Freeman et al. | 320/132 |
| 6,653,880 | B1 * | 11/2003 | Obata et al. | 327/198 |
| 6,792,553 | B1 * | 9/2004 | Mar et al. | 713/330 |
| 2002/0073347 | A1 * | 6/2002 | Zafarana et al. | 713/300 |
| 2002/0104031 | A1 * | 8/2002 | Tomlinson et al. | 713/320 |
| 2004/0201931 | A1 * | 10/2004 | Korcharz et al. | 361/18 |

OTHER PUBLICATIONS

Summit Microelectronics, Inc. SMT4004, Quad Tracking Power Supply Manager, Summit Microelectronics, Inc. 2001, pp. 1-35.
Summit Microelectronics, Inc. SMT4214, Expandable Four-Rail Tracking Manager, Summit Microelectronics, Inc. 2001, pp. 1-17.
Analog Devices, Communications System Supervisory/Sequencing Circuit, Analog Devices, Inc., 2002, pp. 1-45.

* cited by examiner

Primary Examiner—Lynne H. Browne
Assistant Examiner—Fahmida Rahman
(74) Attorney, Agent, or Firm—MacPherson Kwok Chen & Heid LLP; Tom Chen

(57) ABSTRACT

Power-sequencing controllers are connected to allow more complex power sequencing and/or larger numbers of voltage supplies to be monitored than with a single controller. Power-on-reset (POR) output signals from the "slave" controllers are connected by a wired-OR, and the composite output is used as a reset signal or indicator signal by the "master" controller. An output from the master controller coupled to the composite input signal is connected with the $\overline{POR}$ output of the master controller by a wired-OR, and this composite signal is coupled to the reset terminals of the slave controllers. Connecting controllers in a master/slave configuration allows prevents any of the slave devices from starting until all the devices have been released, resulting in synchronous processing of subsequent signals and events.

20 Claims, 6 Drawing Sheets

EXPANSION METHOD FOR COMPLEX POWER-SEQUENCING APPLICATIONS

TECHNICAL FIELD

The present invention relates to in-system programmable power-sequencing controllers and, in particular, to methods of controlling power-sequencing between multiple devices.

BACKGROUND

Many types of current semiconductor devices, such as complex programmable logic devices (CPLDs), have multiple voltage sources or supplies (e.g., 3.3V and 5V) to power different portions of the device. For example, with voltage rails supplying two different voltages, a control mechanism is needed to control the order, timing, ramping, and voltage differential in which the rails are powered up and down. This is commonly known is power-sequencing. Without proper power-sequencing, the device can be subject to short-term failures or malfunction. For example, improper sequencing can damage portions of the device by mechanisms known as latch-up or cause false initialization of device portions, such as memory or logic circuits.

To address this general problem of power-sequencing, dedicated devices have been developed specifically suited to perform the controlled sequencing of several power supplies. These are referred to as power-sequencers. However, as sequencing requirements for boards requiring many power supplies or power supply areas become increasingly more complex, a single power-sequencer device may no longer be able to meet all the system or user needs. Even though each power-sequencer may be highly programmable in both characteristics and functionality, the actual needs in any given power-sequencing application may exceed the capabilities of any of those devices. In these cases, connecting multiple devices together can increase the functional capabilities and allow more complex functions to be implemented. In some applications, large numbers of power supplies, e.g., 12 or more, may have to be monitored and controlled on a board, such as properly sequenced generation of Enable signals for power supplies, LDOs (low drop out voltage regulators), or power FET (field effect transistor) switches. As a result, multiple devices assigned to handle the complex power-sequencing process may be required.

In those cases, problems generally arise during power-up or power-down sequences since each power-sequencer device typically has its own protocol for supplying power during these operations with different electrical characteristics, including start times and ramping rates. Currently, both programmable and fixed devices exist to handle the power management process, such as during power-up or power-down. However, problems may arise when combining these devices to handle complex power-sequencing needs. For example, during a power-up (or wake-up) phase, control signals to multiple power supplies, LDOs or power-FETs may be improperly or unintentionally released.

Such undesired wake-up results are due in part to the finite time required for each of the devices to assume their internal configuration, establish all internal operating points, and begin proper operation. That finite wake-up time varies due to manufacturing tolerances, making it necessary to synchronize the actual start of the overall sequencing process. It is also conceivable that other devices (e.g., third-party supervisory and monitory ICs, either fixed or programmable) would participate in the overall power-supply monitoring and sequencing process, making it desirable to allow for synchronization of all devices involved. Thus, a method that inhibits the release of any control signals which could potentially turn on various power supplies and thereby harm or destroy the electronics connected to those supplies is desired.

Furthermore, since power supply monitoring and sequencing is highly critical to the robust operation of the entire system which these power supplies feed, the sequencers for both single and multiple devices should be able to withstand harsh operating conditions (e.g., large transitions in supply voltage).

Accordingly, it is desirable to have a robust power-sequencing method for multiple devices that is not prone to false synchronization and premature assertion of operational signals.

SUMMARY

In accordance with one aspect of the present invention, the power-on-reset (POR) signals generated from multiple "slave" power-sequencing controllers are connected together by a wired-OR (referred herein as a "PORS", indicating POR signals from the slaves). This composite output signal of the wired-OR is input to a "master" power-sequencing controller, which is utilized by the master controller to inhibit starting of any sequencing action in the master, until the slowest or last slave device has properly initialized. An output of the master controller is coupled to the composite POR signal. This output is connected with a POR signal generated from the master controller by a wired-OR connection (herein referred to as a "PORM", indicated signals from the master). The wired-OR output PORM from the master is connected to reset terminals of the slave controllers. The wired-OR connections prevent any of the slave devices from starting their respective sequencing action until all the devices have been released.

In one embodiment, a plurality of discrete power-sequencing controllers are not released until all the controllers are ready for operation, e.g., when each has reached their respective minimum voltage thresholds. At this time, all the controllers are released substantially at the same time, providing a substantially synchronous start for all the controllers. Each controller asserts a POR signal while powering up for operation, and de-asserts the POR signal when the controller is ready. Thus, when all the POR signals from the connected controllers are detected as de-asserted, all the controllers are released for operation. One controller may also be held in a wait or reset state until the POR signal from another controller is de-asserted. This prevents a controller from being released until other controllers associated with it are ready for operation.

According to another embodiment, a master clock signal from the master controller is coupled to the clock inputs of the slave controllers to override any local clock signal generated inside each of the slave devices. This, in combination with the wired-OR composite signals, allows a synchronous start of all power-sequencing controllers in the system as well as synchronous processing of subsequent signals and events.

By connecting multiple power-sequencing controllers, more complex power-sequencing can be performed. Further, if the controllers are also able to monitor supplies, connecting multiple controllers allows additional supplies to be monitored by the resulting system than with a single controller.

In accordance with another aspect of the invention, a power-sequencing controller is connected to an external programmable logic device (PLD), a complex PLD (CPLD), or other external logic device. Monitored supply voltages at the inputs of the controller are available at monitored-voltage outputs of the controller. Additional input-monitored supply voltages are routed to non-dedicated output terminals such that all available input-monitored voltages are accessible at the output of the controller. The outputs are then coupled to inputs of the external PLD. Further, the POR signal from the controller is coupled to the reset terminal of the external PLD, and the controller clock signal is coupled to the input clock terminal of the PLD. Output signals are available to the controller through output to input terminal connections between the two devices. Consequently, the resulting system is capable of more complex power-sequencing than with the single power-sequence controller.

This invention will be more fully understood in light of the following detailed description taken together with the accompanying drawings.

BRIEF DESCRIPTION OF THE DRAWINGS

Use of the same reference numbers in different figures indicates similar or like elements.

DETAILED DESCRIPTION

The present invention provides methods and structures for controlling the synchronous start of a plurality of connected devices and the synchronous processing of signals from the devices by combining indicator signals, such as a power-on reset or POR signal, from each "slave" device in a wired-OR connection to a "master" device. The POR signal from the master device is combined, also in a wired-OR connection, with another output signal from the master device that indicates whether each slave device has released its POR signal. This combined "PORM" signal is input to each slave device. Combining the signals in this way indicates that all devices are ready to start, thus inhibiting the slave devices from being released prematurely.

Figure 1:
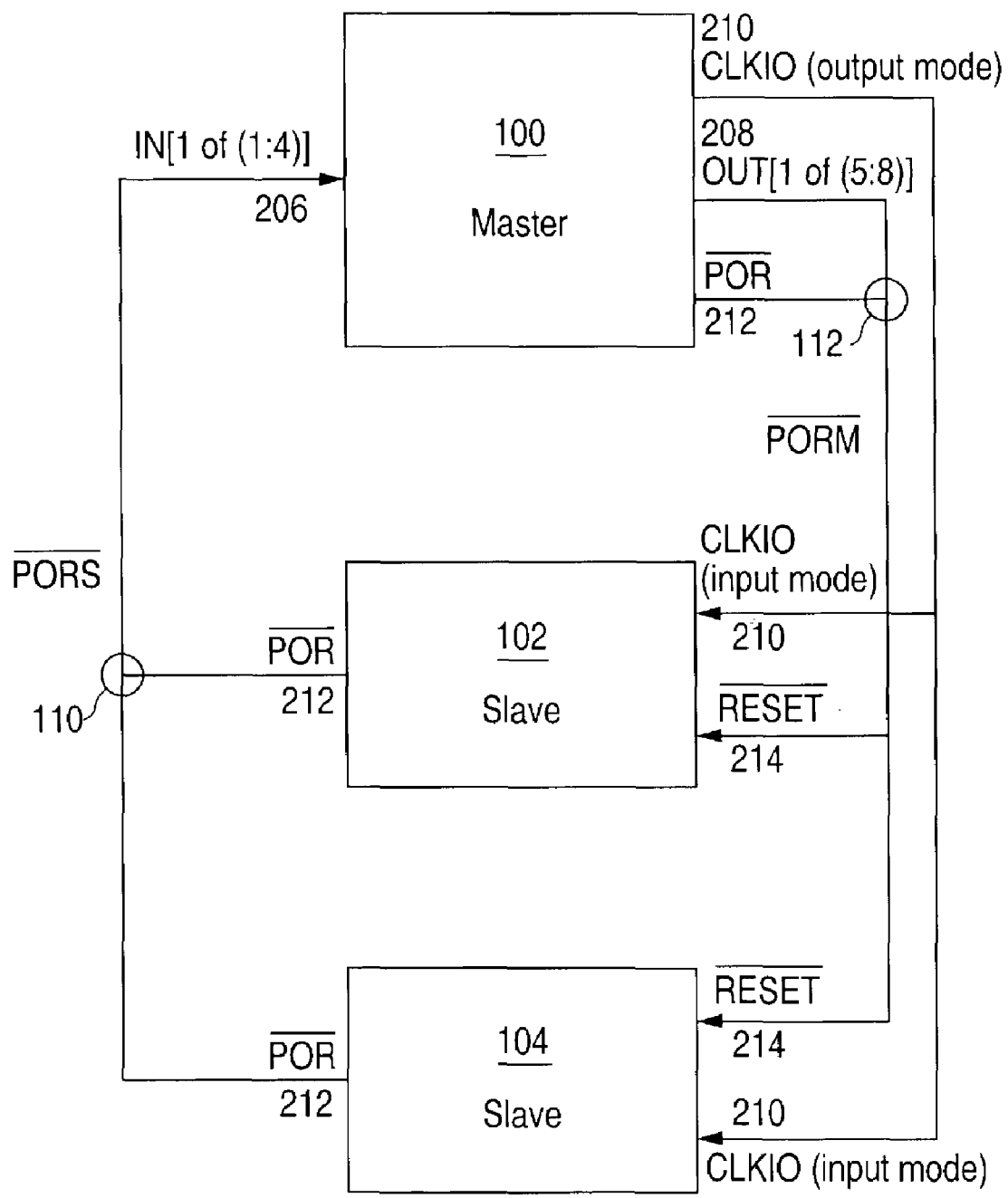
FIG. 1 is a block diagram of a master/slave configuration of multiple power-sequencing controllers according to one embodiment of the invention.

FIG. 1 is a block diagram illustrating one embodiment of the present invention. Multiple devices, such as power-sequencing controllers and monitors are connected together to allow controlling and monitoring of large numbers (e.g., 12 or more) of power supplies and/or to allow more complex sequencing than what a single power-sequence controller and monitor is capable of. As used herein, controller refers to devices that are capable of power supply sequencing and/or monitoring. One power-sequencing controller is designated as a master device 100, while the remaining controllers are designated slave devices 102 and 104. Master and slave devices 100, 102, and 104 can be the same power-sequencing controllers. One example of a suitable power-sequencing controller is the family of in-system programmable (isp) power-sequencing controllers from Lattice Semiconductor (ispPAC-PWR1208 and ispPAC604). Other types of power-sequencing controllers with internal programmable logic devices (PLDs) can also be used with the invention. A typical PLD includes an AND array and macrocells.

Figure 2:
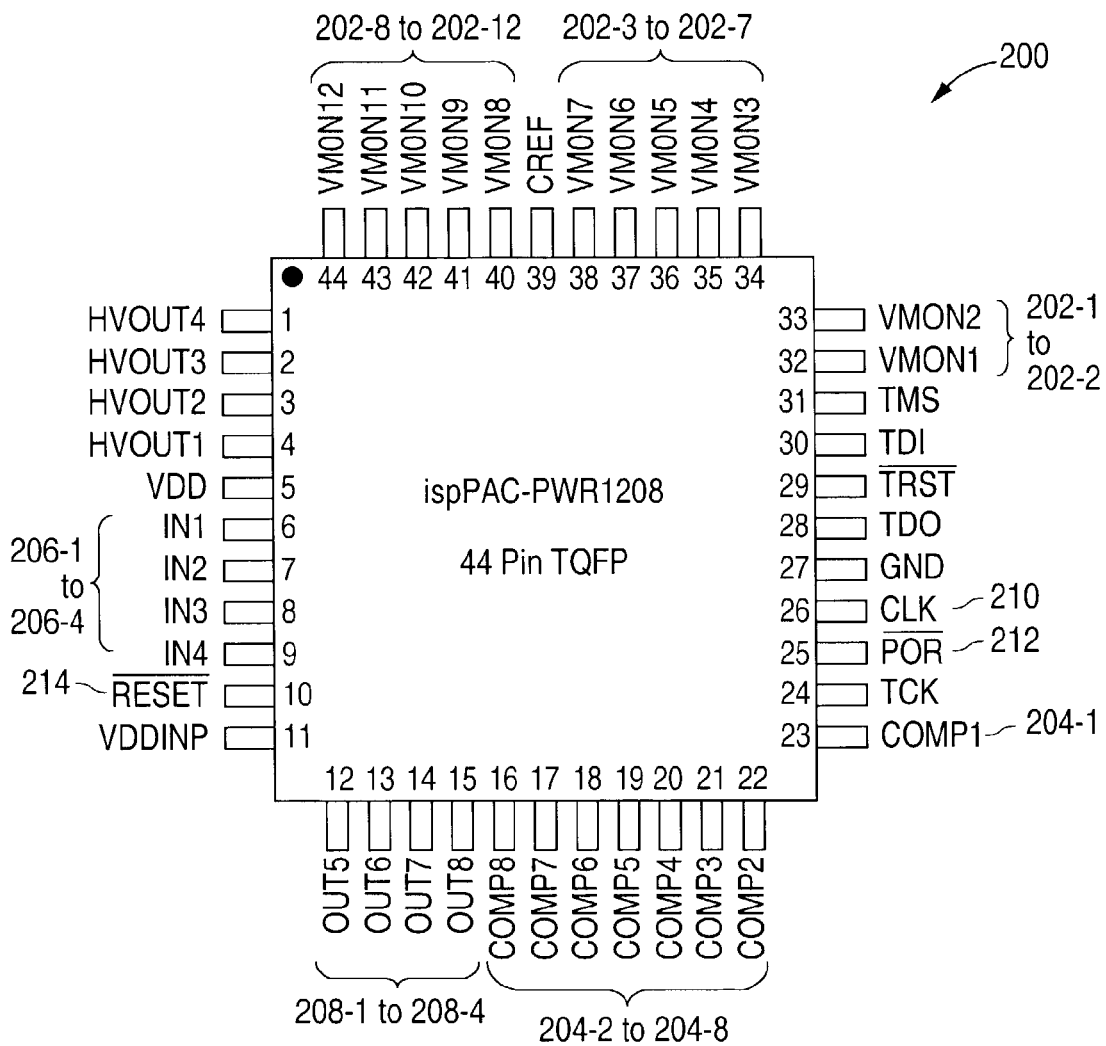
FIG. 2 is a diagram of input/output pins in a packaged controller according to one embodiment.
Figure 3:
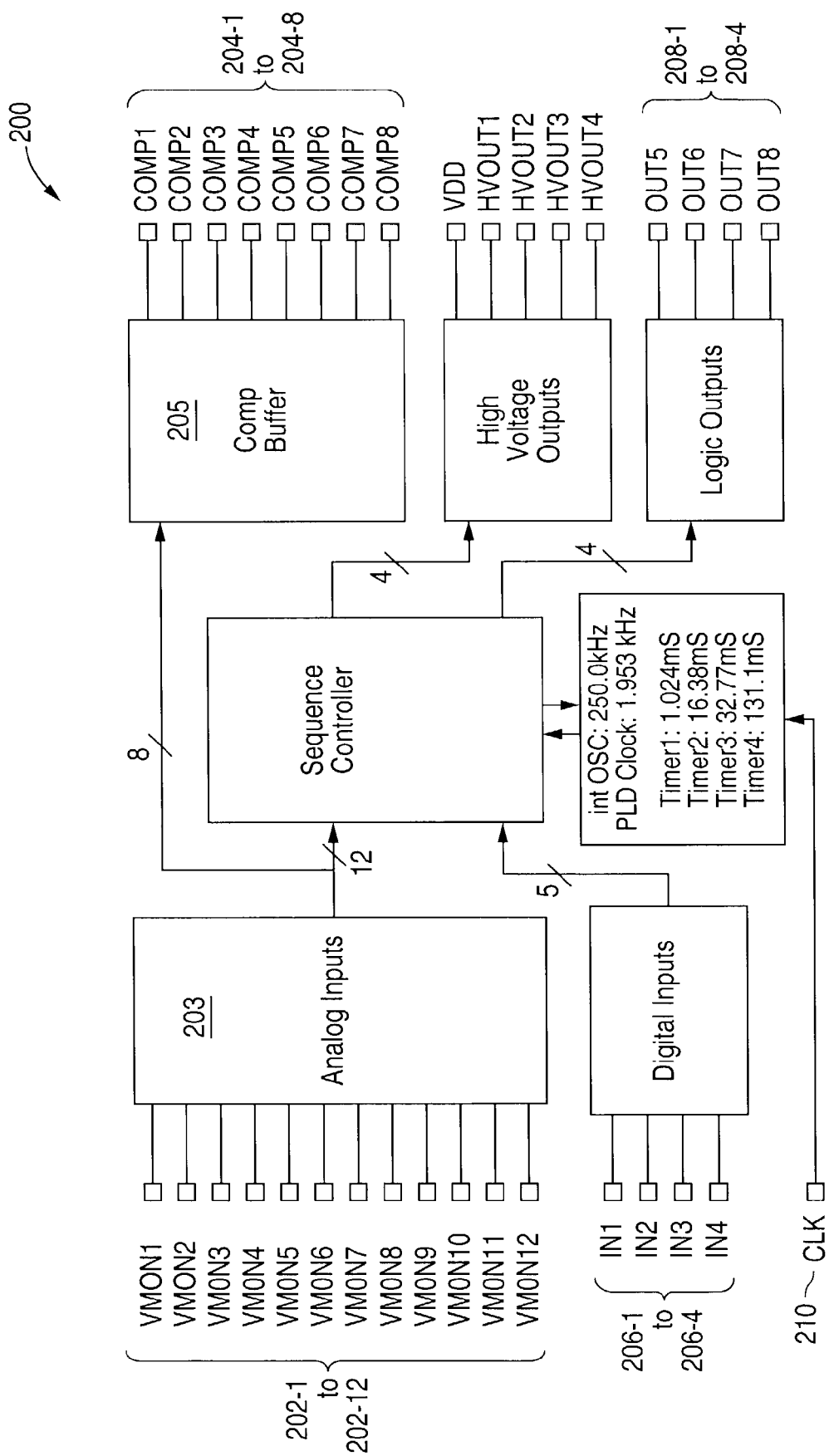
FIG. 3 is a block diagram of the controller of FIG. 2 and input/output pins.

A controller 200, available from Lattice Semiconductor and suitable as master and/or slave controllers 100, 102, 104 in FIG. 1, is shown in FIGS. 2 and 3. FIG. 2 shows the input and output pins of controller 200, while FIG. 3 is a top level block diagram of controller 200 with some of the input and output pins. A more detailed description of a power-sequencing controller can be found in commonly-owned U.S. patent application Ser. No. 09/732,216, entitled "Programmable Power Management System and Method", filed Dec. 6, 2000 and incorporated by reference in its entirety. Controller 200 has a plurality of inputs and outputs. There are twelve analog voltage monitor (VMON) input pins 202-1 to 202-12, which provide the capability of simultaneously monitoring up to twelve independent voltages or supplies. The range of VMON is between 0 and 5.5 volts, e.g., voltages can include typical supply voltages such as 1.2V, 1.5V, 1.8V, 3.3V, and 5.0V. VMON pins 202-1 to 202-12 are coupled to an analog input circuit 203, which includes individual analog input monitors, as will be discussed below. Monitored voltage output pins (COMP) 204-1 to 204-8 are coupled to VMON input pins 202-1 to 202-8, respectively, through analog input circuit 203 and a comparison buffer circuit 205 so that the monitored analog voltage is available at output pins of controller 200. Controller 200 also has digital input pins (IN) 206-1 to 206-4 that receive digital signals used by digital logic or other control circuits (not shown) and feed directly into the device.

Figure 4:
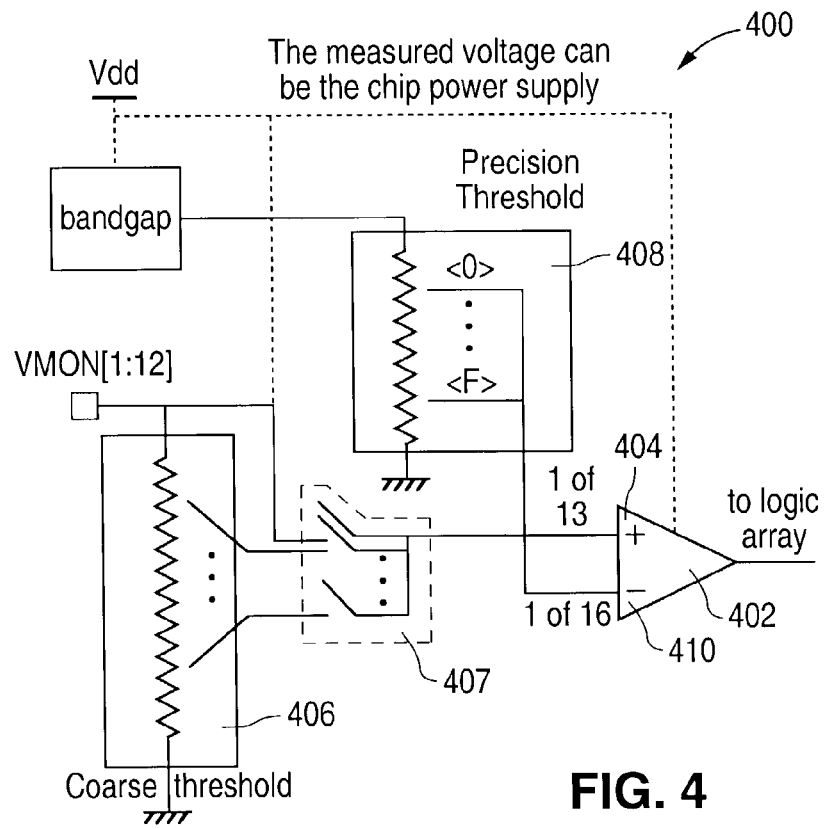
FIG. 4 is a diagram of a voltage comparator according to one embodiment.

Voltage monitoring is arranged as twelve independent comparators, each capable of monitoring one of the following voltages: 1.2V, 1.5V, 1.8V, 2.5V, 3.3V, or 5.0V, although other voltages in this range are also suitable. FIG. 4 shows one such comparator circuit 400 according to one embodiment. Thus, analog input circuit 204 includes twelve comparator circuits 400. Note that the user can monitor other voltages if desired. For example, by means of external resistors, any input voltage larger than 1.2V can be monitored against non-standard thresholds. All twelve voltages can be monitored simultaneously (i.e., a continuous time operation).

Comparator circuit 400 includes a voltage comparator 402 having an input node 404 that provides the voltage to be monitored. An integrated voltage divider network 406 offers two "coarse" attenuation factors for each of twelve supplies. For example, for a 5.0V supply, the two choices may be 5.0V+8% and 5.0V−7%. Voltage divider network 406 establishes high and low voltage thresholds that establish a window of interest for monitoring the voltage at input node 404. In addition to the twelve voltages from VMON, the chip's own power supply voltage Vdd may also be chosen. Thus, a selection is made, such as by switches or multiplexers 407, of one of twelve voltages (which includes the chip's own supply voltage) and the coarse attenuation factor to input node 404. A user may use fuses to select the voltage to be monitored or a range of interest. As an example, the attenuation stage may include resistors that step down the monitored input voltage to a nominal voltage (e.g., 1.2V) and switches that are employed to select the desired attenuation.

Once the coarse attenuation is selected, a precision threshold circuit 408 allows the user sixteen steps (1% each step) for a fine adjustment of the actual trip point. In effect, the user can monitor a predefined voltage (e.g., 5V) from −14% to +15% in 1% steps. One of the sixteen steps is input to node 410 of comparator 402. Precision threshold circuit 408 may include a resistor network for selecting the desired voltage or step, as is known by those skilled in the art.

Voltage comparator 402 may also employ programmable hysteresis that scales with the voltage they monitor. For example, voltage comparator 402 may each have a programmable hysteresis range of 20 mV divided into four steps along with user programmable alternating current (AC) filtering to either react to or ignore power line glitches. Generally, a larger hysteresis is better. However, as power supply voltages get smaller, that hysteresis increasingly affects trip-point accuracy. Therefore, in one embodiment, the hysteresis is approximately 13 mV for 5V supplies and scales down to approximately 3 mV for 1.2V supplies, or about ⅓ of a step size.

Table 1 below shows user-selectable standard voltages along with the individually programmable trip point range, according to one embodiment.

TABLE 1

| Supply Voltage Selection (V) | Lowest trip point (V) (% nom.) | Highest trip point (V) (% nom.) | Size of 1% step (mV) |
|---|---|---|---|
| 5.400 (5.0 + 8%) | 5.007 (+0.1%) | 5.744 (+14.9%) | 50 |
| 4.650 (5.0 − 7%) | 4.311 (−13.8%) | 4.945 (−1.1%) | 50 |
| 3.564 (3.3 + 8%) | 3.305 (+0.2%) | 3.791 (+14.9%) | 33 |
| 3.069 (3.3 − 7%) | 2.849 (−13.7%) | 3.268 (−1.0%) | 33 |
| 2.700 (2.5 + 8%) | 2.504 (+0.2%) | 2.872 (+14.9%) | 25 |
| 2.325 (2.5 − 7%) | 2.155 (−13.8%) | 2.472 (−1.1%) | 25 |
| 1.944 (1.8 + 8%) | 1.803 (+0.2%) | 2.068 (+14.9%) | 18 |
| 1.674 (1.8 − 7%) | 1.549 (−13.9%) | 1.777 (−1.3%) | 18 |
| 1.620 (1.5 + 8%) | 1.502 (+0.1%) | 1.723 (+14.9%) | 15 |
| 1.395 (1.5 − 7%) | 1.291 (−13.9%) | 1.481 (−1.3%) | 15 |
| 1.296 (1.2 + 8%) | 1.202 (+0.2%) | 1.378 (+14.8%) | 12 |
| 1.116 (1.2 − 7%) | 1.035 (−13.6%) | 1.187 (−1.1%) | 12 |

Referring back to FIGS. 2 and 3, in addition to output COMP pins 204-1 to 204-8, controller 200 includes logic output pins (OUT) 208-1 to 208-4, which provide signals from logic functions within the controller. The OUT signal indicates whether all of the slave devices have released their respective power-on-reset ($\overline{POR}$) signals and are thus all ready for the next power sequencing event. Other pins include a clock input/output (CLK) 210, a $\overline{POR}$ output 212, and reset ($\overline{RESET}$) input 214. CLK 210 can be used as either an input or output to the device; in master mode, CLK 210 is the device clock output, and in slave mode, CLK 210 is re-routed as a clock input.

The POR circuit monitors supply voltage Vdd. $\overline{POR}$ output 212 is a conventional power-on-reset signal generated from the device, indicating, e.g., that the power applied to the device is sufficient or that the device has done some internal housekeeping and now the device is ready. A power-on-reset (POR) circuit, utilizing voltages generated from a conventional bandgap circuit optimized to operate over a large supply range, provides a stable logic low level (active low) when supply voltage Vdd is ≧0.8V. This signal is used by the digital circuitry for proper initialization. Once a minimum supply voltage (e.g., 0.8V) is reached, the POR circuit will be functional while the supply itself continues to ramp up to its final value, e.g., 2.5V, 3.3V, or 5.0V. Once the power supply reaches a second specific voltage, e.g., 2.0V±0.1V, the $\overline{POR}$ signal is released to allow nominal operation of the digital circuitry. The voltage is selected as the minimum supply voltage needed to guarantee full logic functionality.

Figure 5:
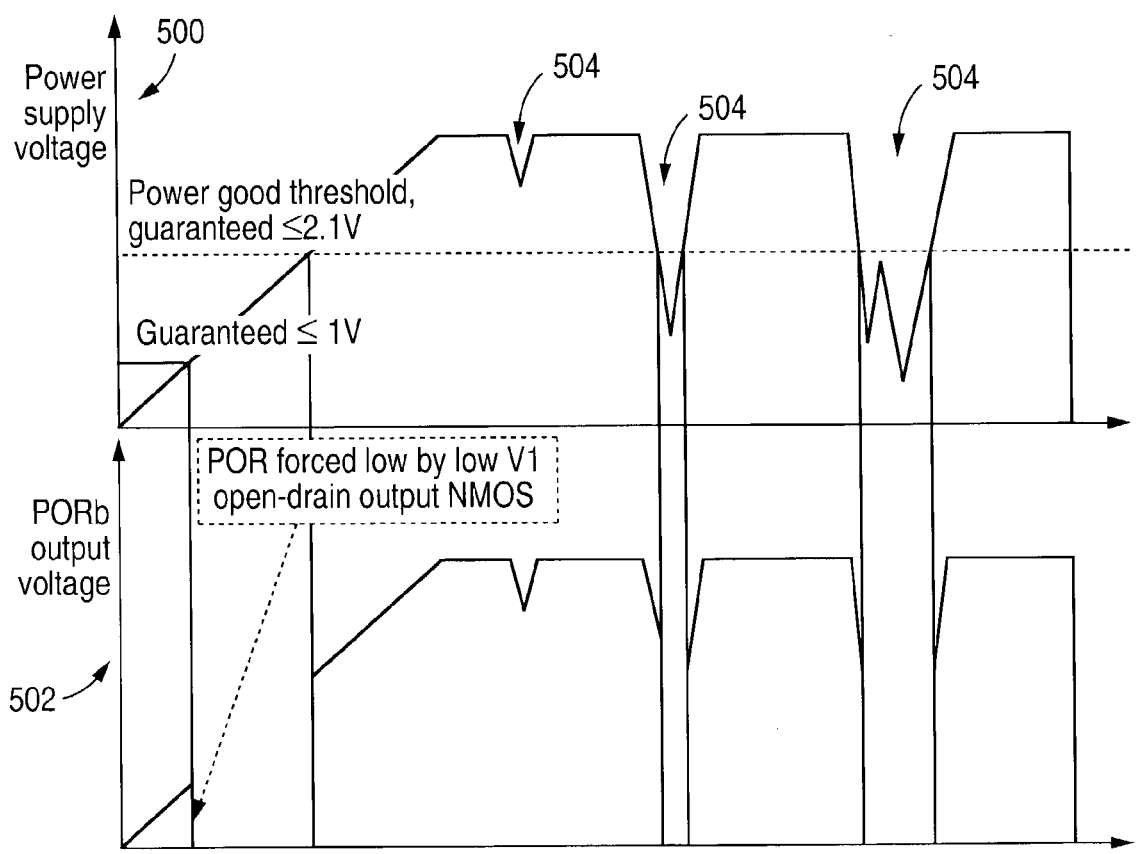
FIG. 5 is a diagram of the power-on-reset signal as a function of the power supply voltage.

FIG. 5 is a diagram showing the $\overline{POR}$ output voltage 502 as a function of the power supply voltage 500 according to one example during a power-up/power-down sequence. As seen from FIG. 5, $\overline{POR}$ goes low when the power supply voltage drops below the specified voltage (2.1V in the example). Glitches 504 in the waveform can result from various factors, such as power fluctuations of the power supply. Thus, when the device is not ready yet, due to not having completed its power-up sequence or the supply has fallen below a minimum voltage, $\overline{POR}$ stays or goes low, respectively.

Referring back to FIGS. 1 and 2, $\overline{RESET}$ input 214, like $\overline{POR}$ output 212, is active low. When driven low, $\overline{RESET}$ input 214 resets all internal flip flops and timers, and may turn "on" or "off" OUT pins 208 depending on the polarity configuration of the outputs in the device. If a reset function is needed for other devices on the board, the device inputs and outputs can be used to generate these signals. $\overline{RESET}$ input 214 can be used if a manual reset button is needed to reset the device logic to the initial state. $\overline{POR}$ output 212 of each slave device 102 and 104 is connected together as a wired-OR 110, and the composite output of the wired-OR ($\overline{PORS}$, indicating $\overline{POR}$ signals from the slaves) is input into one of the four inputs IN 206-1 to 206-4 of the master device 100.

Figure 6:
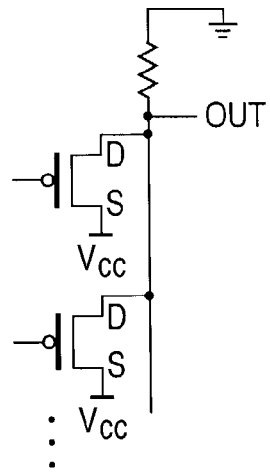
FIG. 6 is a diagram of a wired-OR implementation according to one embodiment.

As is known in the art, a wired-OR can be implemented with open-collector (or open-drain) devices. FIG. 6 shows one example of a wired-OR implementation using PMOS transistors. The sources of PMOS transistors are coupled to a supply voltage, while the drains are tied together to a load resistor coupled to ground. Each input to the gate of PMOS transistors may be the $\overline{POR}$ output signal from a slave device. If $\overline{POR}$ is low, the slave device is not ready yet. Thus, if any of the slave devices are not ready, at least one of PMOS transistors will be on, which will pull the output high. On the other hand if $\overline{POR}$ is high, the slave device is ready to be released, and the open drain output will be high impedance. If all PMOS transistors are off, pull-up resistor, coupled to ground, will pull the voltage at the output to low.

Accordingly, the output of a wired-OR connection is high if any of the inputs are low and is low only if all inputs are high. Thus, the input IN to master device 100 is low only if all of the $\overline{POR}$ output signals from slave devices 102 and 104 are high (e.g., when the monitored supply voltage is above a minimum threshold). If any one of the $\overline{POR}$ output signals is low, the input IN to master device 100 is high. A wired-OR is used since the composite signal to master device 100 is to indicate if at least one of slave devices 102 and 104 is requesting attention, and not to transfer data. Thus, no external logic is required to prevent contention. Note that a wired-OR connection is not the only way to connect the $\overline{POR}$ output signals, as other suitable connections can also be used with the present invention. Further, depending on the polarities of the indicator signals $\overline{POR}$, $\overline{RESET}$, and OUT, other wired-OR implementations are possible, such as using NMOS transistors in which their sources are connected to ground, and their drains are commonly tied to a pull-up resistor coupled to a voltage supply.

The wired-OR combination of each of the slave's output $\overline{POR}$ signal generates a composite slave signal $\overline{PORS}$ that will be released only after each slave $\overline{POR}$ signal has been released (i.e., each signal is high). This composite signal $\overline{PORS}$ enables master device 100 to know when all connected slave devices are operational by coupling the composite signal $\overline{PORS}$ to one of the master device input pins (IN). Thus, when all the slave $\overline{POR}$ signals are released, the input to master device 100 goes low, resulting in the OUT output 208 of master device 100 going high. This indicates that all slaves have released their $\overline{POR}$ signal.

Figure 7:
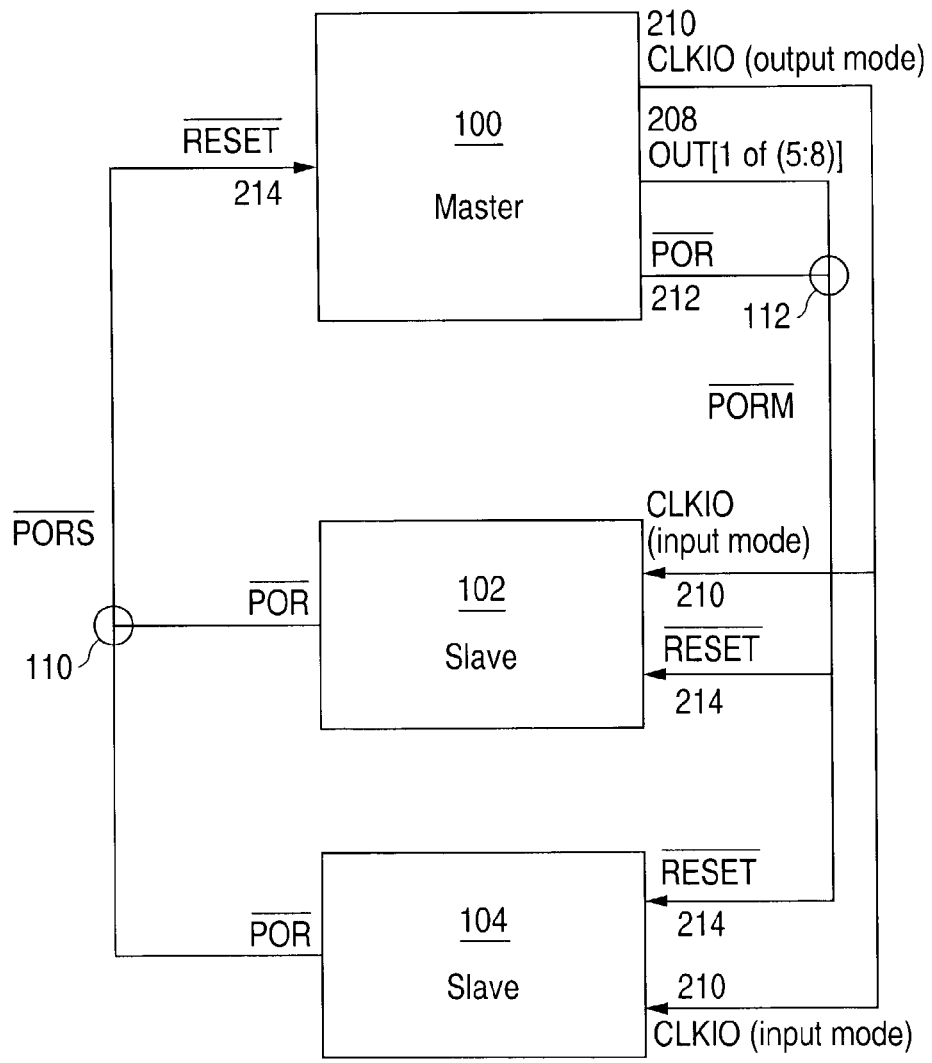
FIG. 7 is a block diagram of multiple power-sequencing controllers according to another embodiment.

In another embodiment, shown in FIG. 7, the composite output signal $\overline{PORS}$ of slave devices 102 and 104 is connected to a $\overline{RESET}$ input 214 of master device 100. This prevents the master device from starting the power sequencing activity when the slave devices are not completely initialized yet.

Utilized as a clock output from master device 100, CLK 210 is coupled to the clock input of slave devices 102 and 104. The clock signal from the master device is used as a master clock for the slave devices and can override any of the local clock signals generated within the slave devices. Further, one of the four outputs OUT 208-1 to 208-4 is connected as a wired-OR 112 to $\overline{POR}$ output 212 of master device 100, resulting in a combined $\overline{PORM}$ signal from the master device. The one OUT signal used in this scheme is responding to the reset (wired-OR $\overline{PORS}$) signal coming from the slaves.

The one OUT signal used in this scheme is responding to the reset (wired-OR $\overline{PORS}$) signal coming from the slaves.

Thus, the signal $\overline{PORM}$ from the wired-OR is low only if both the $\overline{POR}$ output and the associated OUT signal are high, i.e., a logical NAND function of the $\overline{POR}$ output and associated OUT signal. The $\overline{POR}$ output indicates whether the master is ready, while the OUT signal (from the combined $\overline{PORS}$ signal from the slaves) indicates whether all the slaves are ready. Thus, the wired-OR combination of the master's $\overline{POR}$ and OUT signals provides an indication that both master and slave devices are ready. Again, as with the $\overline{POR}$ connection from the slave devices, the connection between the $\overline{POR}$ output and one of OUT outputs 208 can be implemented by methods other than a wired-OR.

In either embodiment, the output of the wired-OR connection is coupled to the $\overline{RESET}$ inputs of slave devices 102 and 104. Thus, slave devices 102 and 104 will not start until all the slave devices have been released. Master device 100 first looks at the state of its IN input. If the composite slave $\overline{PORS}$ signal to IN is high before the master $\overline{POR}$ is released, this result is held until the master $\overline{POR}$ is released. When the master POR is released, the high level at input IN releases the corresponding output OUT, which enables all the slave devices 102 and 104 simultaneously. On the other hand, if master 100 is still in power-up, then its own $\overline{POR}$ output 212 remains low, and the internal logic is held in a reset state. This ensures that the slave devices are held in a reset state and not released until the master device is ready, even when all the slave devices have released their $\overline{POR}$s.

However, if some of the slaves have not completed their wake-up and released their $\overline{POR}$, the master's OUT 208 will remain low and keep the slave devices in a reset state by forcing all slave $\overline{RESET}$ inputs high. Thus, since output OUT is low and the master $\overline{POR}$ is high (the master is ready), the slave devices will not release until OUT goes high. Upon all slave devices $\overline{POR}$ being released, input IN to master device 100 goes low, output OUT is released high, and all slave devices 102 and 104 start synchronously. The various conditions are summarized in Table 2 below.

TABLE 2

| OUT | $\overline{POR}$ (from master) | $\overline{PORM}$ | Slaves kept reset |
| --- | --- | --- | --- |
| low (at least one of $\overline{POR}$ from the slaves is low, indicating that not all slaves are ready) | low (master is not ready) | high | yes |
| low | high (master is ready) | high | yes |
| high (all $\overline{POR}$ from the slaves are high, indicating that all slaves are ready) | low | high | yes |
| high (slaves ready) | high (master ready) | low | no |

Thus, by combining POR signals of connected controllers in a wired-OR, and using that resulting combined signal to inhibit the progress of any device in the group other than the master device, it is possible to control the synchronous start of all participating devices, i.e., all master and slave devices will start synchronously. Furthermore, by connecting the master device clock output to all clock inputs of the slave devices, a master clock signal can override any local clock signal otherwise generated inside each of the slave devices. Combining both features of the invention provides for a synchronous start as well as the synchronous processing of subsequent signals and events.

The above-described circuit and method allows multiple power-sequence controllers to be connected in a master/slave mode, thereby increasing the number of supplies that can be monitored and/or allowing more complex sequencing than is possible with the PLD of a single controller.

Figure 8:
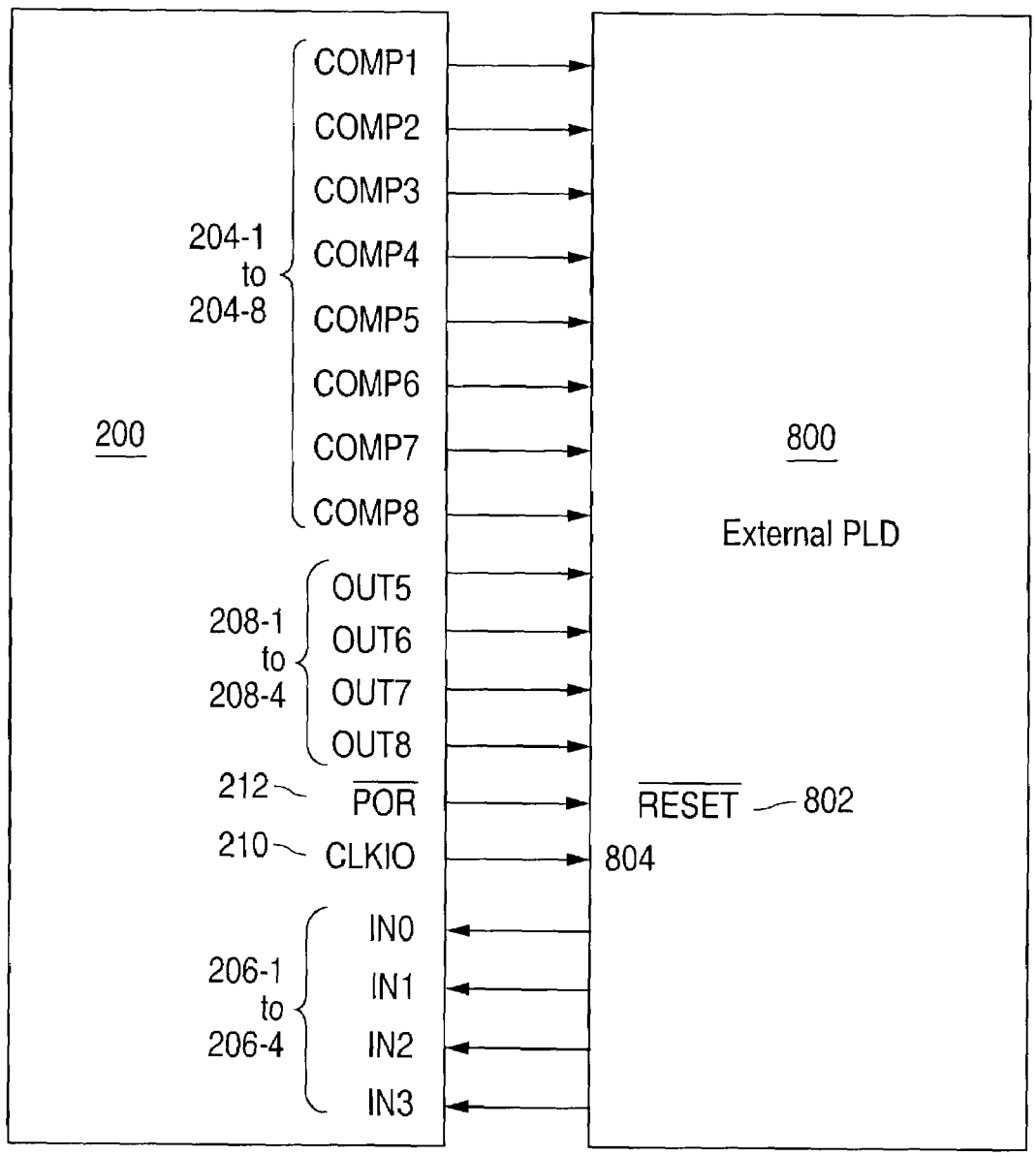
FIG. 8 is a block diagram of a power-sequencing controller connected to an external cPLD according to one embodiment of the invention.

According to another embodiment of the invention, a power-sequencing controller, such as controller 200 of FIGS. 2 and 3, is connected to an external complex programmable logic device (cPLD) 800, as shown in FIG. 8. Any external logic chip or sequencer (PLD, FPGA, microcontroller) can be used as cPLD 800. In some embodiments, devices that are fairly insensitive to power-supply variations are used, such as a GAL22V10 or ispMACH4256, available from Lattice Semiconductor.

Any external logic chip or sequencer (PLD, FPGA, microcontroller) can be used as cPLD 800. In some embodiments, devices that are fairly insensitive to power-supply variations are used, such as a GAL22V10 or ispMACH4256, available from Lattice Semiconductor.

This requires cPLD 800 to be able to access some or all monitoring voltages, as discussed above, from controller 200. Monitored voltage output pins (COMP) 204-1 to 204-8 are coupled to suitable input pins of cPLD 800 to allow cPLD 800 access to analog voltage monitor (VMON) comparators. Since there are still twelve possible monitored supplies, the four remaining VMON signals can be routed to the four logic output pins (OUT) 208-1 to 208-4 of controller 200, which may then be connected to input pins of cPLD 800 to allow access to these respective signals. As a result, all twelve monitored voltages can be utilized by cPLD 800, even though some of these signals can still be processed inside controller 200.

To alert cPLD 800 when controller 200 is being released, $\overline{POR}$ output 212 of controller 200 is connected to a $\overline{RESET}$ input 802 of cPLD 800. In one embodiment, operation and functionality of the $\overline{POR}$ and $\overline{RESET}$ signals is as described above with respect to the master/slave mode. The master clock for controller 200 is provided to cPLD 800 by a connection between CLK 210 (operating as an output) to a clock input 804 of cPLD 800. Digital signals generated from cPLD 800 can be communicated to and utilized by controller 200 through digital input pins (IN) 206-1 to 206-4.

By connecting a power-sequencing controller to an external cPLD in an expansion mode, more complex sequencing is possible than with just the internal PLD of the power-sequencing controller.

The above-described embodiments of the present invention are merely meant to be illustrative and not limiting. It will thus be obvious to those skilled in the art that various changes and modifications may be made without departing from this invention in its broader aspects. For example, the above description illustrates a specific power-sequencing controller with specific input/output pins and function. However, other controllers can be similarly connected as master/slave or with external cPLDs to achieve the advantages of the present invention. Further, two power-sequencing controllers can be utilized, in which both controllers are released only when both are ready for operation. Therefore, the appended claims encompass all such changes and modifications as fall within the true spirit and scope of this invention.

We claim:

1. A method of synchronizing the operation of a plurality of discrete power sequencing controllers, comprising:
   providing at least first and second power sequencing controllers, each controller operable to assert a power-on reset (POR) signal while powering up for operation and to de-assert the POR signal when the controller is ready for operation;
   sensing the POR signals of the controllers; and
   releasing the controllers for operation substantially synchronously after the POR signals of all of the controllers are de-asserted, wherein a POR terminal of the first controller and an output terminal of the first controller are coupled to an input terminal of the second controller, and sensing the POR signals of the controllers includes sensing a composite signal comprised of the POR signal of the first controller and an output signal of the first controller, the output signal derived from the POR signal of the second controller.

2. The method of claim 1, wherein the POR signal is an active low signal.

3. A method for operating a plurality of coupled power-sequencing controllers, comprising:
   determining when all the controllers have reached their associated minimum voltage thresholds; and
   starting the controllers only when all the controllers have reached the minimum voltage thresholds, wherein the determining comprises:
      combining signals from at least two controllers to form a first composite signal, wherein the first composite signal indicates whether the at least two controllers have reached their associated thresholds;
      combining the first composite signal with an output signal from a third controller to form a second composite signal, wherein the output signal indicates whether the third controller has reached its threshold; and
      checking whether the second composite signal indicates that the controllers have all met their associated thresholds.

4. The method of claim 3, wherein the plurality is at least three.

5. The method of claim 3, wherein the combining is by a wired-OR.

6. A power-sequencing controller system, comprising:
   a first power-sequencing controller configured to receive a reset signal, a clock signal, and to generate a first signal;
   a second power-sequencing controller configured to receive the reset signal, the clock signal, and to generate a second signal, wherein the first and second signals from the first and second power-sequencing controllers are coupled together to form a first composite signal;
   a third power-sequencing controller configured to receive the first composite signal and to generate a third signal, a fourth signal, and the clock signal, wherein the first composite signal is coupled to an input terminal of the third power-sequencing controller and wherein the third and fourth signals are coupled together to form the reset signal.

7. The system of claim 6, wherein the first, second, and third signals indicate whether each of the respective controllers are ready to be started.

8. The system of claim 6, wherein the first, second, and third signals are power-on-reset signals.

9. The system of claim 6, wherein the first and second signals are coupled in a wired-OR.

10. The system of claim 6, wherein the input terminal of the third power-sequencing controller is a reset terminal.

11. The system of claim 6, wherein the input terminal of the third power-sequencing controller is coupled to an output terminal of the third power-sequencing controller.

12. The system of claim 11, wherein the third signal and the output terminal of the third power-sequencing controller are coupled as a second wired-OR.

13. The system of claim 12, wherein the output of the second wired-OR is coupled to reset terminals of the first and second power-sequencing controllers.

14. The system of claim 6, wherein the clock signal from the third power-sequencing controller is coupled to clock input terminals of the first and second power-sequencing controller.

15. The system of claim 6, wherein the first and second power-sequencing controllers are slave devices and the third power-sequencing controller is a master device.

16. The system of claim 6, wherein the first, second, third, and reset signals are active low signals.

17. The system of claim 6, wherein at least one of the power-sequencing controllers has a plurality of input and output terminals and a first plurality of monitored voltage output terminals, a power-on-reset (POR) output terminal, and a clock input/output terminal, wherein the first plurality of monitored voltage output terminals is less than a plurality of monitored voltages, and wherein the system further comprises an external programmable logic device (PLD) having a plurality of input and output terminals, a clock input output terminal, and a reset terminal, wherein at least one of the output terminals of the controller couples at least one of the monitored voltages to at least one of the input terminals of the PLD and wherein the first plurality of monitored voltage output terminals and at least one of the output terminals of the controller are coupled to input terminals of the PLD.

18. A power-sequencing controller system, comprising:
   a power-sequencing controller having a first plurality of monitored voltages, a second plurality of input and output terminals, a third plurality of monitored voltage output terminals, a power-on-reset (POR) output terminal, and a clock input/output terminal, wherein the third plurality of monitored voltage output terminals is less than the first plurality of monitored voltages; and an external programmable logic device (PLD) having a plurality of input and output terminals, a clock input output terminal, and a reset terminal, wherein at least one of the output terminals of the controller couples at least one of the monitored voltages to at least one of the input terminals of the PLD and wherein the monitored voltage output terminals of the controller are coupled to input terminals of the PLD.

19. The system of claim 18, wherein the POR output terminal of the controller is coupled to the reset terminal of the PLD.

20. A method of synchronizing the operation of a plurality of discrete power sequencing controllers, comprising:

providing at least first and second power sequencing controllers, each controller operable to assert a power-on reset (POR) signal while powering up for operation and to de-assert the POR signal when the controller is ready for operation;

sensing the POR signals of the controllers; and releasing the controllers for operation substantially synchronously after the POR signals of all of the controllers are de-asserted, wherein sensing the POR signals of the controllers includes sensing a composite signal comprised of the POR signal of the first controller and an output signal of the first controller, the output signal derived from the POR signal of the second controller.

* * * * *